(12) United States Patent
Sakurai et al.

(10) Patent No.: US 7,738,203 B2
(45) Date of Patent: Jun. 15, 2010

(54) MAGNETIC RECORDING MEDIUM FORMATTED WITH ROM AND RAM REGIONS

(75) Inventors: Masatoshi Sakurai, Tokyo (JP); Seiji Morita, Kanagawa (JP); Akira Kikitsu, Kanagawa (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 11/092,682

(22) Filed: Mar. 30, 2005

(65) Prior Publication Data

US 2005/0225890 A1 Oct. 13, 2005

(30) Foreign Application Priority Data

Mar. 31, 2004 (JP) ............................. 2004-104479

(51) Int. Cl.
  G11B 5/09 (2006.01)
  G11B 20/12 (2006.01)
  G11B 5/02 (2006.01)
(52) U.S. Cl. ............... 360/48; G9B/5.026; G9B/20.031
(58) Field of Classification Search ........................ None
  See application file for complete search history.

(56) References Cited

U.S. PATENT DOCUMENTS 5,363,251 A * 11/1994 Kamo et al. .................. 360/55
5,966,259 A * 10/1999 Mitsuishi et al. ............... 360/48
6,263,151 B1 * 7/2001 Nishijima et al. .............. 386/68
6,433,944 B1 * 8/2002 Nagao et al. .................. 360/16
7,038,872 B2 * 5/2006 Yip et al. ....................... 360/48
2002/0025039 A1 * 2/2002 Kato et al. ..................... 380/44
2002/0191317 A1 * 12/2002 Yasunaga ..................... 360/48
2004/0107355 A1 6/2004 Sakurai et al.

FOREIGN PATENT DOCUMENTS

| JP | 62-256225 | 11/1987 |
|---|---|---|
| JP | 10-255407 | 9/1998 |
| JP | 2002-197725 | 7/2002 |

* cited by examiner

Primary Examiner—Daniell L Negrón
(74) Attorney, Agent, or Firm—Oblon, Spivak, McClelland, Maier & Neustadt, L.L.P.

(57) ABSTRACT

A magnetic recording medium has a RAM region and a ROM region. The RAM region includes a plurality of first tracks each having a first magnetic portion. The first magnetic portions in adjacent tracks are separated from each other. The ROM region includes a plurality of second tracks each having a second magnetic portion. A width of the second magnetic portions in a direction perpendicular to a track direction of the first tracks is larger than that of the first magnetic portions in the perpendicular direction.

7 Claims, 15 Drawing Sheets

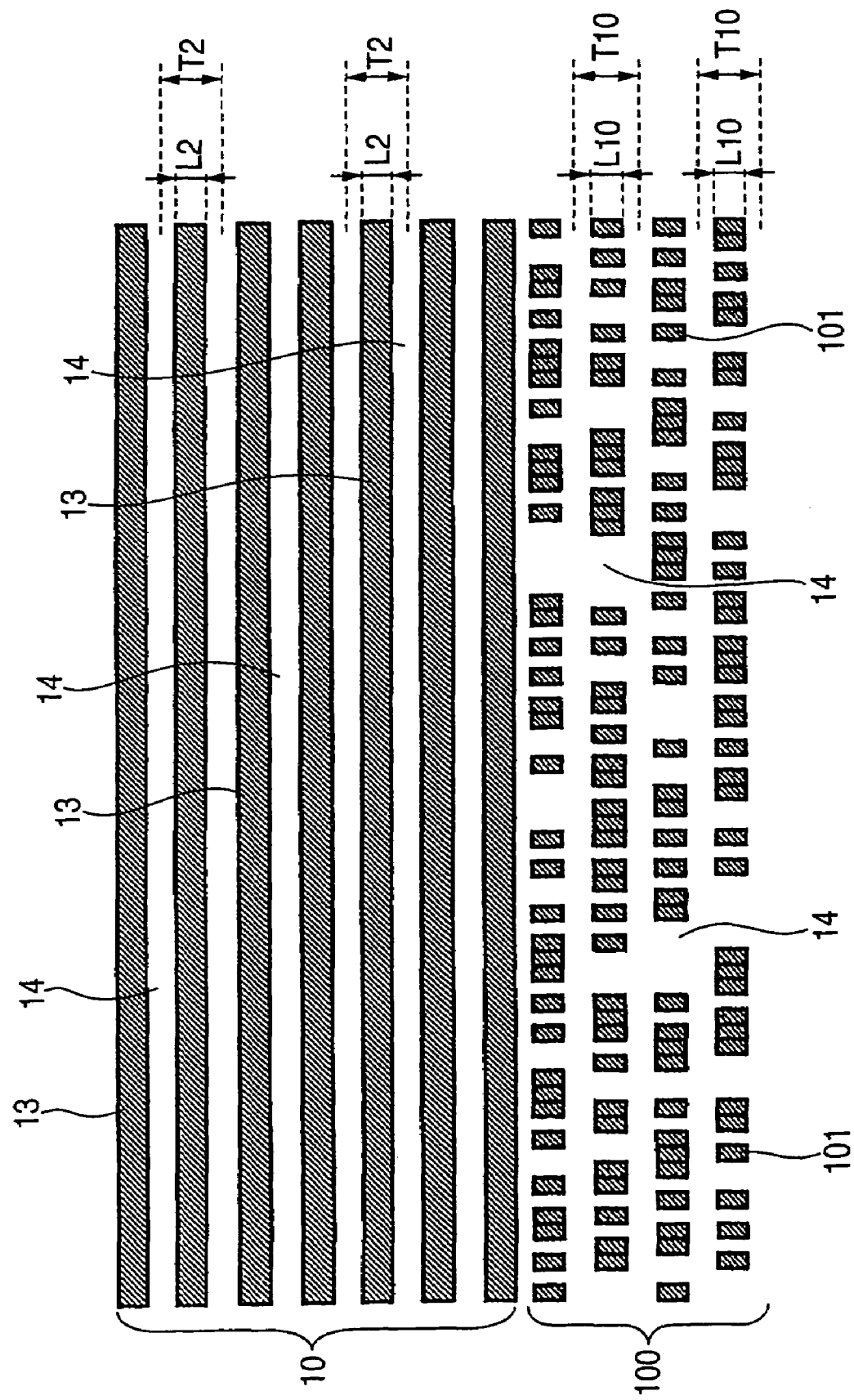

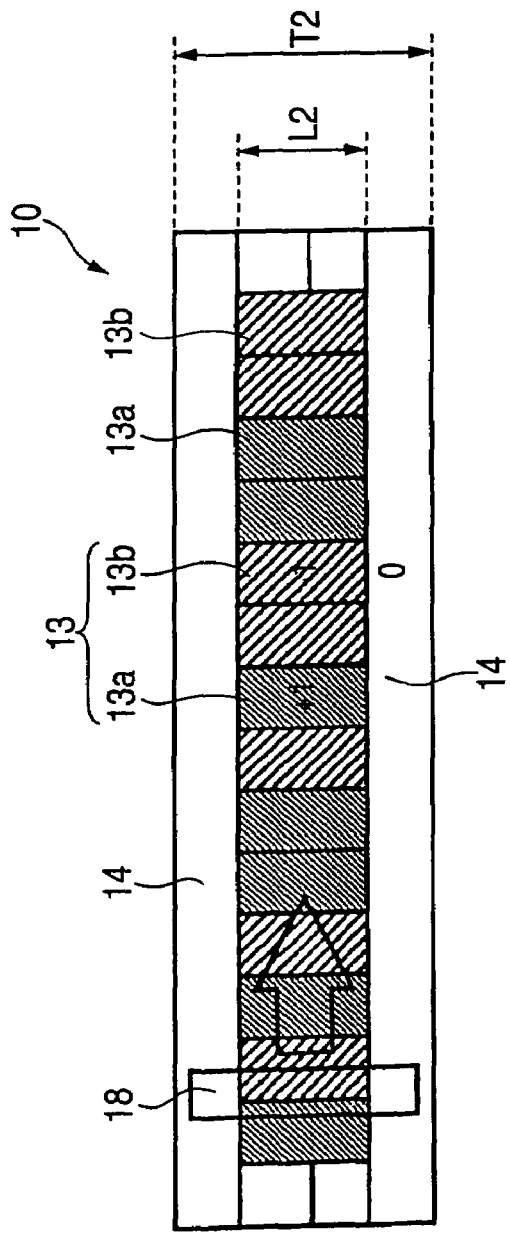
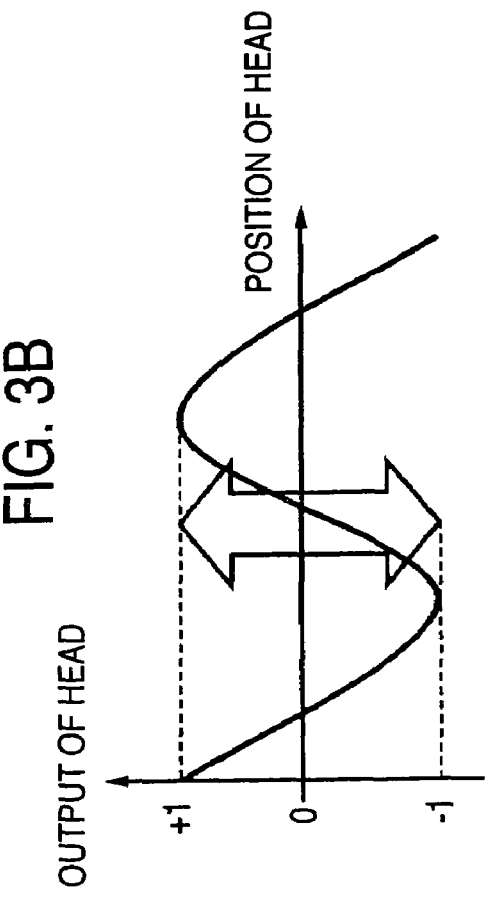

FIG. 13
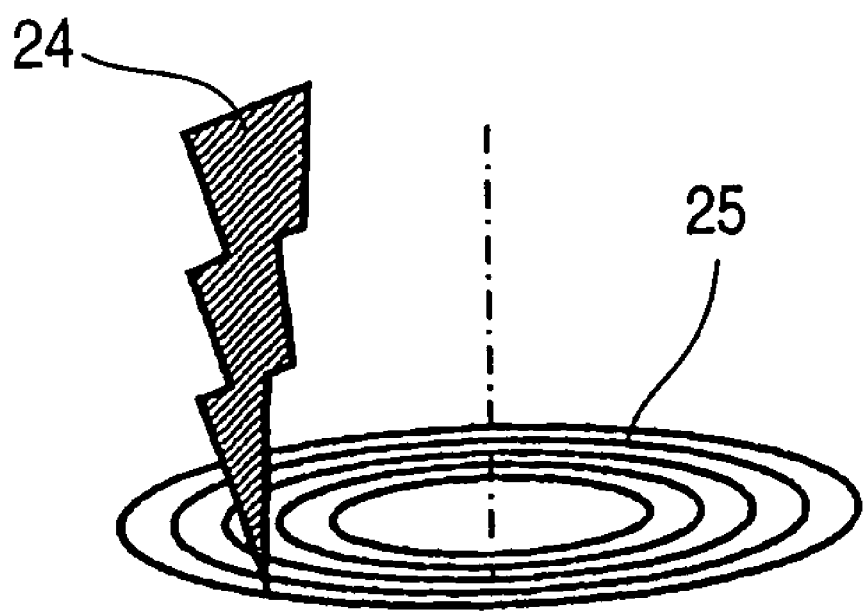
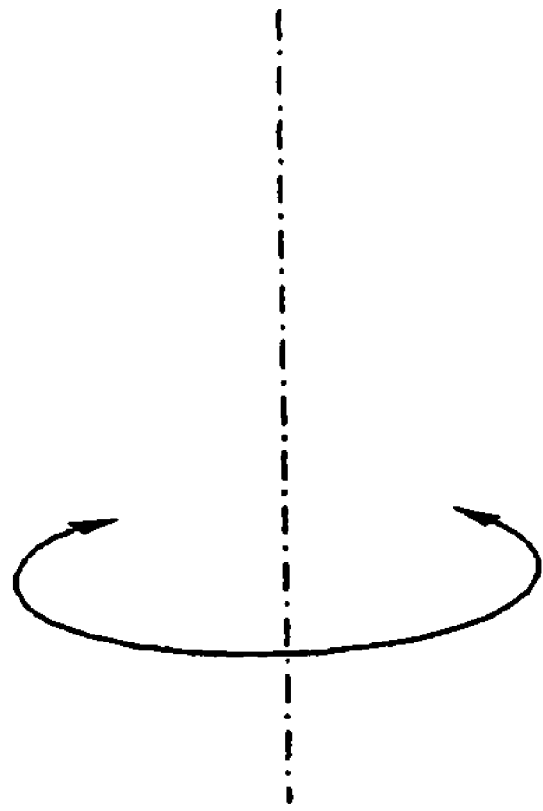

MAGNETIC RECORDING MEDIUM FORMATTED WITH ROM AND RAM REGIONS

BACKGROUND OF THE INVENTION

1. Field of the Invention

The present invention relates to a magnetic recording medium, a manufacturing method thereof, and a magnetic recording/reproducing apparatus, and more particularly, to a magnetic recording medium having a rewritable RAM (Random Access Memory) region and an unrewritable ROM (Read Only Memory) region, a manufacturing method of the magnetic recording medium, and a magnetic recording/reproducing apparatus including the magnetic recording medium.

2. Description of the Related Art

In response to demand for an increase in storage capacity, a recent magnetic recording device, a magnetic disk drive, and a hard disk drive must increase recording density of a magnetic recording medium. However, in association with an increase in recording density, there is arising a problem that magnetic information recorded by a read/write head, which moves over the medium relatively, affects recording of an adjacent track. There has been proposed a countermeasure for avoiding such a problem by physically separating magnetic substances in adjacent tracks (see, e.g., JP-A-Sho. 62-256225).

Magnetic substances on a magnetic recording medium are patterned to record t servo information and ROM information according to presence or absence of the magnetic substances (see, e.g., JP-A-Hei. 10-255407).

The method for patterning a magnetic substance on a magnetic recording medium includes, for example, a nanoimprint method. This method first draws and develops a desired pattern of magnetic substances as an irregularity pattern on a master disk by using a rotary disk writing system. Next, this method forms an imprint stamper onto which the irregularity pattern on the surface of the master disk are transferred, from the master disk. Then, the method presses the imprint stamper against a resist film applied over the recording medium, thereby transferring the irregularities on the surface of the stamper to the resist film. Finally, the method transfers the irregularities on the surface of the resist film to a lower recording layer by means of a technique, such as etching, to thus pattern the magnetic substances.

BRIEF SUMMARY OF THE INVENTION

However, results of inventors' study show that when an attempt is made to implement a magnetic recording medium having a RAM region and a ROM region by using the thus-patterned magnetic substances, signals obtained from the respective regions are different from each other in terms of signal intensity, thereby rendering reading operation difficult.

The invention has been made in view of this problem and provides a magnetic recording medium having a ROM region and a RAM region from which data can be read with superior signal intensity, as well as providing a method for manufacturing the magnetic recording medium and a magnetic recording/reproducing apparatus.

In order to solve the problem, according to one embodiment of the invention, a magnetic recording medium has a RAM region and a ROM region. The RAM region includes a plurality of first track search having a first magnetic portion. The first magnetic portions in adjacent tracks are separated from each other. The ROM region includes a plurality of second tracks each having a second magnetic portion. A width of the second magnetic portions in a direction perpendicular to a track direction of the first tracks is larger than that of the first magnetic portions in the perpendicular direction.

According to one embodiment of the invention, a magnetic recording apparatus has the magnetic recording medium as set forth above and a read/write head. The read/write head moves relatively to the magnetic recording medium, records information into the magnetic recording medium, and reproduces the information recorded in the magnetic recording medium.

According to one embodiment of the invention, in the magnetic recording apparatus, the read/write head writes a magnetization pattern into the second magnetic portions of the ROM region of the magnetic recording medium.

According to one embodiment of the invention, a method for manufacturing a stamper for a magnetic recording medium, includes applying a resist film onto a substrate having a RAM region and a ROM region; drawing with a plurality of exposure beam lines on the resist film applied onto the substrate, x lines of the exposure beam lines corresponding to grooves of the stamper in the RAM region to form each of first tracks of the RAM region, y lines of the exposure beam lines corresponding to grooves of the stamper in the ROM region to form each of second tracks of the ROM region, wherein the exposure beam lines extend in a track direction and x<y; transferring an exposed pattern onto the substrate; and transferring a transferred pattern of the substrate to the stamper.

Also, according to one embodiment of the invention, a method for manufacturing a master disk for a magnetic recording medium, includes applying a resist film onto the master disk having a ROM region and a RAM region; drawing with a plurality of exposure beam lines on the resist film applied onto the master disk, x lines of the exposure beam lines corresponding to ridges of the master disk in the RAM region to form each of first tracks of the RAM region, y lines of the exposure beam lines corresponding to ridges of the master disk in the ROM region to form each of second tracks of the ROM region, wherein the exposure beam lines extend in a track direction and x<y; and transferring an exposed pattern onto the master disk.

According to the embodiment of the invention, in the magnetic recording medium having the ROM region and the RAM region, a good balance can be achieved between a signal reproduced from the ROM region and a signal reproduced from the RAM region. Moreover, it is possible to provide an authentication region. Further, it is also possible to nullify and initialize the ROM region.

Consequently, there can be provided a magnetic recording medium having high recording density and capable of storing various types of authentication data and reliably reproducing the data, thereby offering a large industrial merit.

BRIEF DESCRIPTION OF THE DRAWINGS

FIG. 2 is a schematic diagram exemplifying, as a comparative example of the invention, a part of the planar structure of a magnetic recording medium reviewed during the course of the inventors having come to conceive the invention.

FIGS. 3A and 3B are schematic diagrams for describing signal intensity obtained from a RAM region of the magnetic recording medium according to the embodiment of the invention.

FIG. 13 is a schematic diagram illustrating a method for manufacturing a magnetic recording medium according to the embodiments of the invention.

DETAILED DESCRIPTION OF THE INVENTION

Embodiments of the invention will be described hereinbelow with reference to the drawings.

Figure 1:
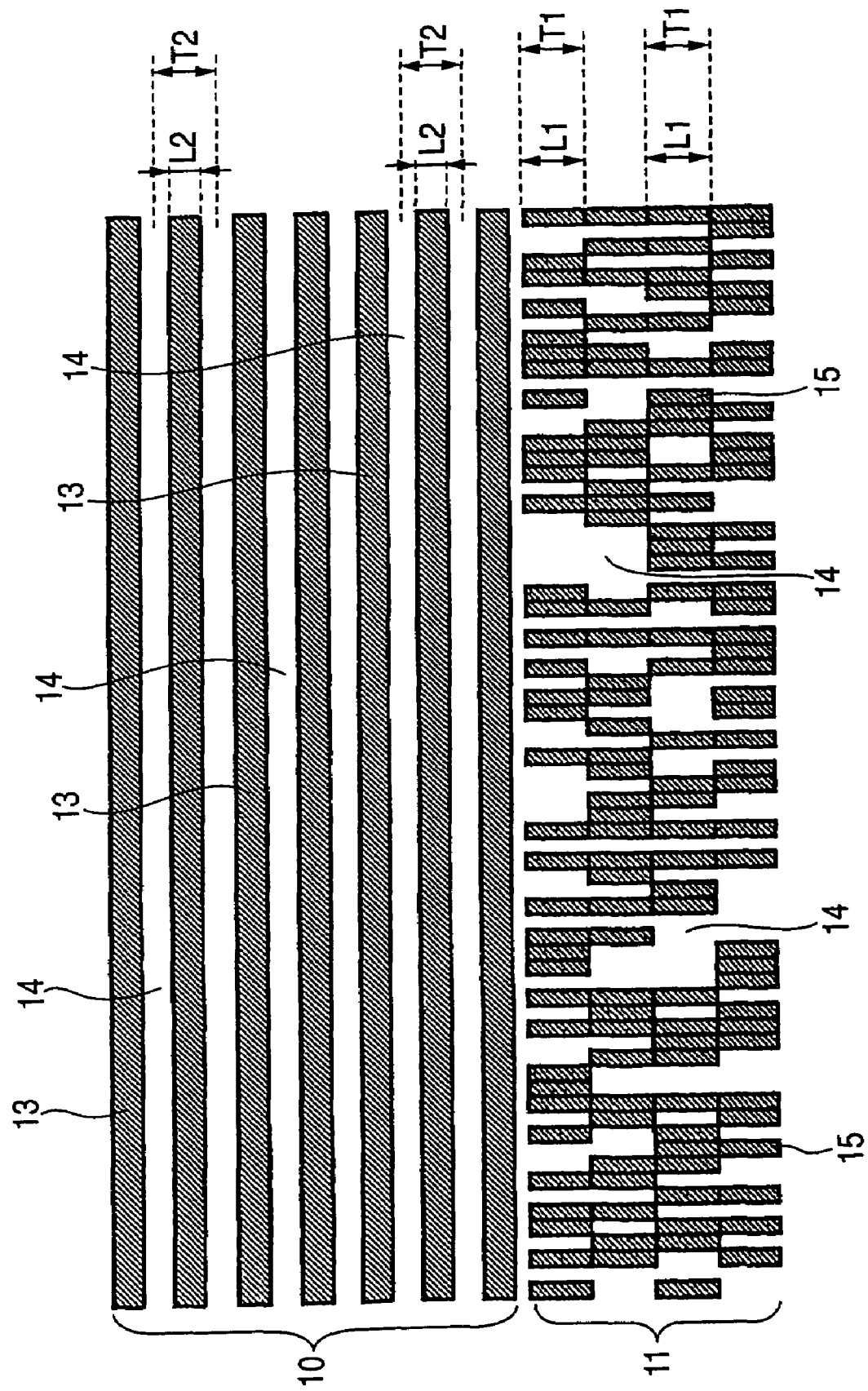
FIG. 1 is a schematic diagram exemplifying a part of the planar structure of a magnetic recording medium according to an embodiment of the invention.

FIG. 1 is a schematic diagram exemplifying a part of a plane structure of a magnetic recording medium according to an embodiment of the invention. This magnetic recording medium has a RAM region 10 and a ROM region 11.

In the RAM region 10, a plurality of magnetic portions 13 are continuously arranged to extend in a longitudinal direction of tracks. In the RAM region 10, the magnetic portions 13 in adjacent tracks are physically separated from each other. Specifically, a width L2 of the magnetic portion 13 when viewed in a direction perpendicular to the longitudinal direction of the tracks is smaller than a track width T2. Area other than the magnetic portions 13 is formed from a nonmagnetic portion 14. Specifically, strips of the magnetic portions 13 and strips of the nonmagnetic portions 14 are alternately arranged in the RAM region 10.

On the other hand, in the ROM region 11, a plurality of magnetic portions 15 are intermittently arranged in the longitudinal direction of the tracks. Intervals between the magnetic portions 15 within a single track are not uniform, and the magnetic portions 15 are arranged intermittently. In the case of a specific example shown in FIG. 1, the magnetic portions 15 in adjacent tracks remain in physical contact with each other. Namely, a width L1 of the magnetic portion 15 when viewed in the direction perpendicular to the longitudinal direction of the tracks is equal to a track width T1. In the ROM region 11, areas other than the magnetic portions 15 are formed of the nonmagnetic portions 14.

In this embodiment, the track width T1 in the ROM region 11 and the track width T2 in the RAM region 10 are equal to each other. The width L1 of the magnetic portions 15 in the ROM region 11 is broader than the width L2 of the magnetic portions 13 in the RAM region 10.

FIG. 2 is a schematic diagram exemplifying, as a comparative example, a part of the planar structure of a magnetic recording medium studied during the course of the present inventor having come to conceive the embodiment of the invention. Specifically, in this magnetic recording medium, magnetic portions in all the regions are equal in width to each other. This magnetic recording medium has the RAM region 10 and a ROM region 100.

In the RAM region 10, the plurality of magnetic portions 13 are continuously arranged to extend in the track direction. In the RAM region 10, magnetic portions 101 in adjacent tracks are physically separated from each other. In short, the width L2 of the magnetic portion 13 when viewed in the direction perpendicular to the longitudinal direction of the tracks is smaller than the track width T2. Since areas other than the magnetic portions 13 are the nonmagnetic portions 14, strips of the magnetic portions 13 and strips of the nonmagnetic portions 14 are alternately arranged in the RAM region 10.

When data are recorded in the RAM region 10, a write head (not shown) moves over the magnetic portion 13 in parallel to the longitudinal direction of the tracks and sequentially changes the magnetization directions of the magnetic portions 13, to thus perform recording operation. At the time of reproducing operation, a read head (not shown) moves over the magnetic portions 13 in parallel to the longitudinal direction of the tracks and sequentially reads magnetic fields corresponding to the magnetization directions of the magnetic portions 13, to thus perform reproducing operation. Specifically, the directions of magnetization of the magnetic portions 13 in the RAM region 10 are classified into a first direction and a second direction, which is a reversal thereof.

A plurality of magnetic portions 101 are intermittently arranged in the ROM region 100 in the longitudinal direction of the tracks. Intervals between the magnetic portions 101 in a single track are not uniform, and the magnetic portions 101 are arranged intermittently. The magnetic portions 101 in adjacent tracks are physically separated from each other in the ROM region 100, as well. Namely, a width L10 of the magnetic portions 101 when viewed in the direction perpendicular to the longitudinal direction of the tracks is smaller than a track width T10. In the ROM region 100, areas other than the magnetic portions 101 are formed of the nonmagnetic portions 14.

When the data of the ROM region 100 are reproduced, the read head (not shown) moves over the magnetic portions 101 and sequentially reads magnetic fields from the intermittently-provided magnetic portions 101, to thus perform reproducing operation. Magnetization of all the magnetic portions 101 in the ROM region 100 is usually aligned in a single direction. Hence, data are often recorded by means of physical arrangement of the magnetic portions 101.

In the magnetic recording medium shown in FIG. 2, the width L10 of the magnetic portions 101 in the ROM region 100 is equal to the width L2 of the magnetic portions 13 in the RAM region 10. The track width T10 in the ROM region 100 is also equal to the track width T2 in the RAM region 10.

As mentioned above, when data are reproduced from the magnetic recording medium in which the RAM region 10 and the ROM region 100 having the same width of the magnetic portions are mixedly present, by means of a single read/write head, there arises a problem that signals derived from the respective regions are different in intensity from each other. More specifically, magnetic portions having two types of reversed magnetization directions exist in the RAM region 10. Hence, when an attempt is made to read data from the RAM region 10 by using an MR (Magnetoresistance Effect) or a GMR (Giant Magnetoresistance Effect) head, the thus-read signal is converted into an electric current flowing through the element. The intensity of the thus-obtained signal falls between +1 and −1. In contrast, the magnetization direction of the magnetic portions 101 in the ROM region 100 is constant. Further, the width L10 of the magnetic portions 101 in the ROM region 100 is equal to the width L2 of the magnetic portions 13 in the RAM region 10. Hence, the intensity of the obtained signal falls within a range between +1 and 0.

Specifically, the signal read by the read head assumes +1 and −1 in the RAM region 10 in which the magnetic portions 13 have two types of reversed magnetization directions. Therefore, signal amplitudes having a difference of 2 (two) are obtained. In contrast, in the ROM region 100 in which the magnetic portions 101 have a constant magnetization direction, there are produced a signal +1 and a signal 0. Namely, the signal amplitudes assume 1 (one). Accordingly, a signal obtained from the ROM region 11 in which provided are the magnetic portions 101 having the same width as that of the magnetic portions 13 in the RAM region 10 has a smaller signal amplitude required for identification in comparison with the RAM region 10. Hence, there arises a problem that it is difficult to read the signals obtained from the ROM region 100.

In the meantime, as shown in FIG. 1, in this embodiment, the width L1 of the magnetic portion 15 in the ROM region 11 is made larger than the width L12 of the magnetic portion 13 in the ROM region 10. Therefore, it is possible to facilitate reading signals from the ROM 11.

FIGS. 3 to 5 are schematic diagrams for describing signal intensity obtained from the magnetic recording medium according to the embodiment of the invention and that obtained from the magnetic recording medium of the comparative example.

FIGS. 3A and 3B is schematic diagrams for describing signal intensity obtained from the RAM region 10 of the magnetic recording medium according to the embodiment of the invention. FIG. 3A shows the planar structure of the RAM region 10 of the magnetic write head according to the embodiment of the invention. In the RAM region 10 shown in FIG. 3A, magnetic portions 13a having a magnetization direction for imparting a signal +1 to a read head 18 and magnetic portions 13b having a magnetization direction for imparting a signal −1 to the read head 18 are arranged to extend in the longitudinal direction of the track. Intervals between the magnetic portions 13a in a single track are not necessarily uniform, and the magnetic portions 13b are arranged intermittently. Specifically, the width L2 of the magnetic portions 13 when viewed in the direction perpendicular to the longitudinal direction of the track is smaller than the track width T2. Areas other than the magnetic portions 13a, 13b are formed of the nonmagnetic portions 14.

As shown in FIG. 3B, signals are sequentially output in the RAM region 10 in accordance with movement of the read head 18, whereby a signal, which oscillates between signal intensity +1 and signal intensity −1, is obtained. An obtained amplitude is 2.

Figure 4A:
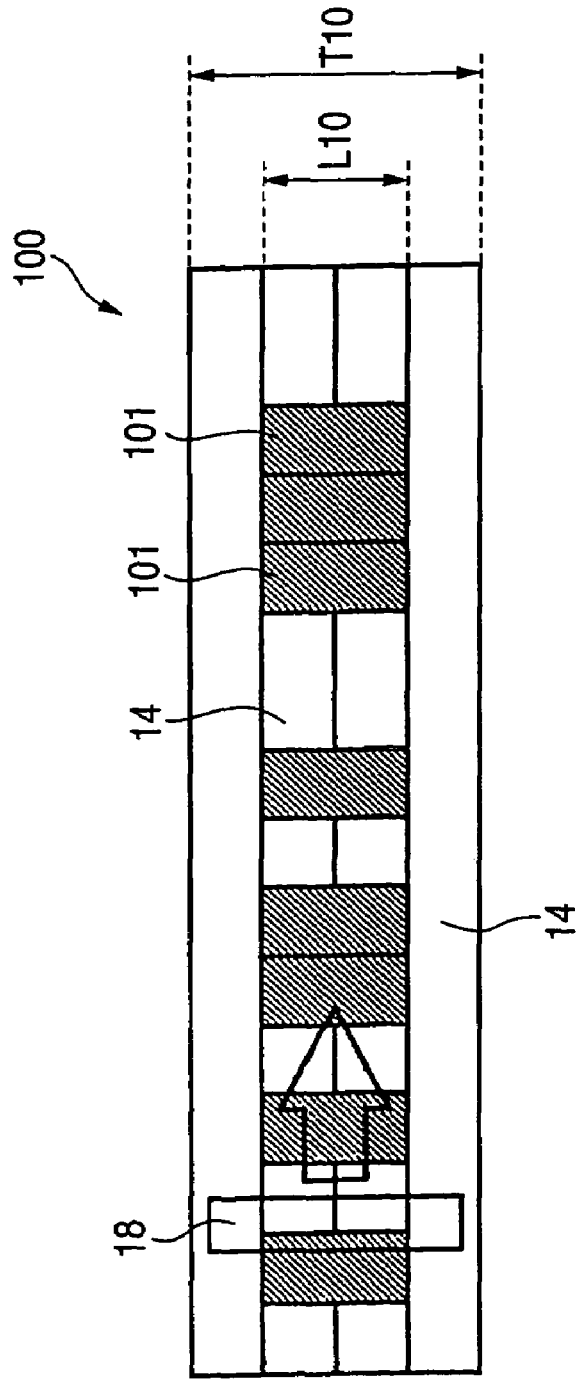
FIGS. 4A and 4B are schematic views for describing signal intensity obtained from a ROM region 100 of the magnetic recording medium according to the comparative example.
Figure 4B:
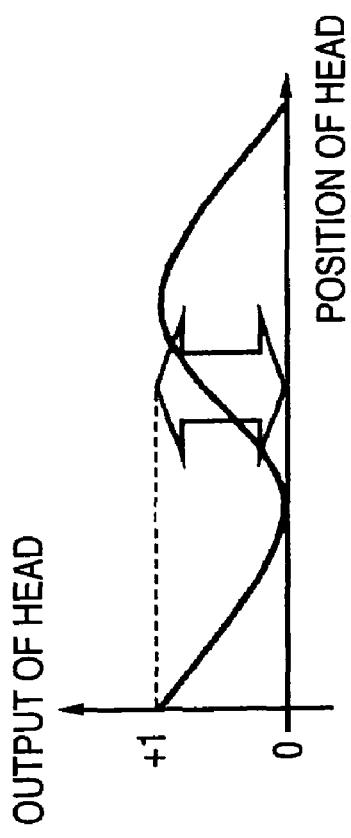

FIGS. 4A and 4B are schematic views for describing signal intensity of the ROM region 100 of the magnetic recording medium of the comparative example. In short, FIG. 4A shows a planar structure of the ROM region 100 of the comparative example shown in FIG. 2. As shown in FIG. 4A, the magnetic portions 101 having a magnetization direction for imparting a signal +1 to the read head 18 are intermittently arranged in the longitudinal direction of the track. Intervals between the magnetic substances 100 in a single track are not uniform, and the magnetic portions 101 are arranged intermittently. In the ROM region 100, the magnetic portions 101 in adjacent tracks are physically separated from each other. That is, the width L10 of the magnetic portion 101 when viewed in the direction perpendicular to the longitudinal direction of the track is smaller than the track width T10. Areas of the ROM region 100 other than the magnetic portions 101 are formed of the nonmagnetic portions 14. The width L10 of the magnetic portions 101 in the ROM region 100 is equal to the width L2 of the magnetic portion 13 in the RAM region 10. The track width T10 of the ROM region 100 is also equal to the track width T2 of the RAM region 10.

As shown in FIG. 4B, in the ROM region 100 in which the magnetic portions 101 are equal in width to the magnetic portions 13 in the RAM region 10, signals are sequentially output in accordance with movement of the read head 18, whereby signals, which oscillate at a signal intensity between +1 and 0, are obtained. That is, the amplitude of the obtained signal is as small as 1 (one).

Figure 5A:
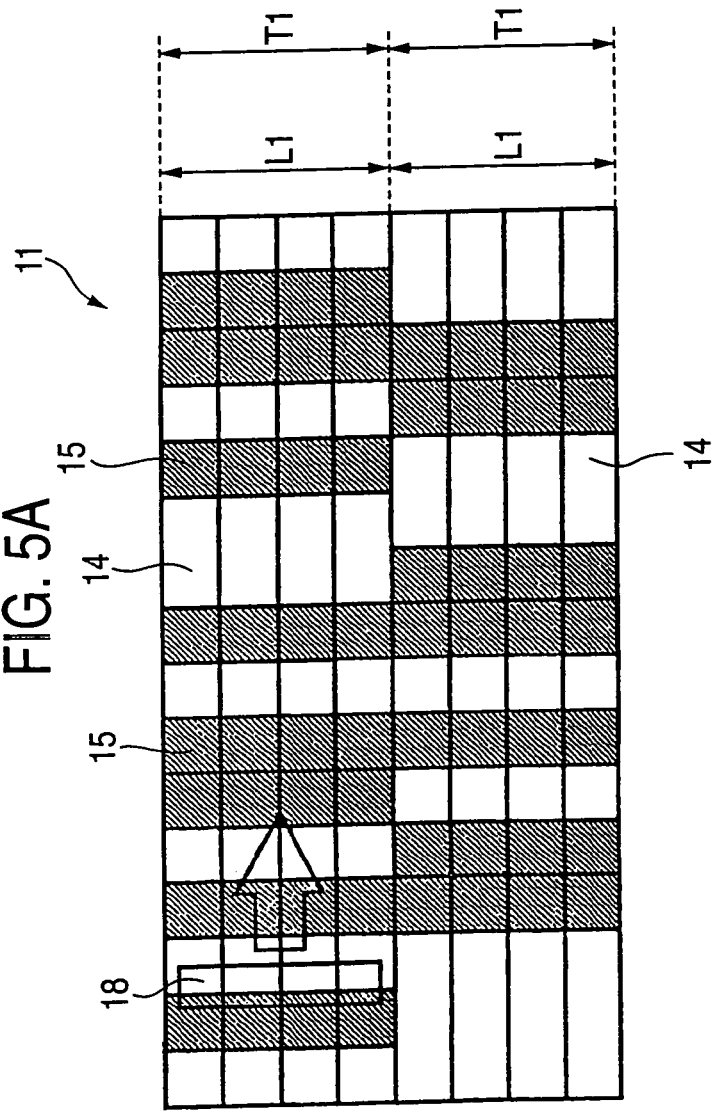
FIGS. 5A and 5B are schematic diagrams for describing signal intensity obtained from a ROM region of the magnetic recording medium according to the embodiment of the invention.
Figure 5B:
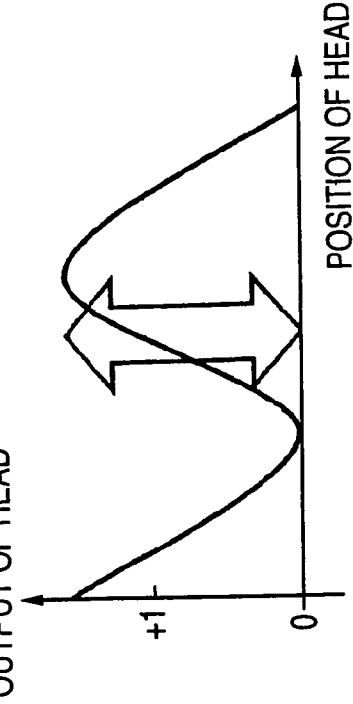

FIGS. 5A and 5B are schematic diagrams for describing signal intensity in the ROM region 11 of the magnetic recording medium according to the embodiment of the invention. FIG. 5A shows a planar structure of the ROM region 11 in which the magnetic portions 15 are greater in width than the magnetic portions 13 in the RAM region 10. As shown in FIG. 5A, the magnetic portions 15 having such a magnetization direction as to impart a signal of positive sign to the read head 18 are fully arranged in the width direction of the track. That is, the magnetic portions 15 in adjacent tracks remain in physical contact with each other in the ROM region 11. The width L1 of the magnetic portions 15 in the direction perpendicular to the tracks is equal to the track width T1. The areas other than the magnetic portions 15 are formed of the nonmagnetic portions 14. At this time, the width L1 of the magnetic portions 15 in the ROM region 11 is greater than the width L2 of the magnetic portions 13 in the RAM region 10. The track width T1 is equal to the track width T2.

As shown in FIG. 5B, signals are sequentially output in accordance with movement of the read head 18 in the ROM region 11 in which the magnetic portions 15 are greater in width than the magnetic portions 13 in the RAM region 10. At this time, the width L1 of the magnetic portions 15 is greater than the width L2 of the magnetic portions 13 (FIG. 1). Hence, a signal having an intensity greater than +1 is obtained. Namely, signals obtained from the ROM region 11 in which the width L1 of the magnetic portions 13 is greater than that L2 of the magnetic portions 13 in the RAM region 10 oscillate between a signal intensity 0 corresponding to nonmagnetic portions 14 and signal intensity +1 obtained from the magnetic portions 15. The amplitude of the resultantly obtained signal becomes greater than 1.

When the signal intensity obtained from the RAM region 10 shown in FIG. 3 is compared with that obtained from the ROM region 100 of the comparative example shown in FIG. 4, the signal intensity obtained from the ROM region 100 of the comparative example has come to substantially one-half that obtained from the RAM region 10. Therefore, it is difficult to distinguish the signal intensity obtained from the ROM region 100 of the comparative example. In contrast, as exemplified in FIG. 5, since the width of the magnetic portions 15 in the ROM region 11 is broadened, the intensity of the signal that the read head 18 receives from the magnetic portions 15 can be made greater. In this case, on the assumption that the signal intensity obtained from the RAM region 10 is taken as "+1," the signal intensity obtained from the ROM region 11 in which the magnetic portions 15 are wider in width than those 13 of the RAM region 10 becomes greater than "+1".

In the magnetic recording medium according to the embodiment of the invention, by broadening the width of the magnetic portions in the ROM region, a difference in signal intensity (signal amplitude) substantially equal to that achieved in the RAM region is obtained. Since sufficiently-high signal intensities are obtained from both of the RAM region and the ROM region, it is possible to record/reproduce data into/from the RAM region and to reproduce data from the ROM region.

When the recording/reproduction apparatus is used, all of the magnetic portions 15 in the ROM region 11 are magnetized in a given direction with respect to the direction of the track. The read/write head 18 does not perform recording of data into the ROM region 11. Accordingly, the data recorded in adjacent tracks are not adversely affected from each other during recording operation. Therefore, in order to achieve high recording density, the magnetic portions 13 in the RAM region 10 must be separated from each other by reducing the width L2 of the magnetic portions 13 in adjacent tracks. In contrast, since the write head 18 does not need to perform writing operation into the ROM region 11 during the course of usage of the recording/reproduction apparatus, the width L1 of the magnetic portions 15 can be broadened up to the track width T1.

As mentioned above, according to the magnetic recording medium of the embodiment of the invention, data can be reproduced from the ROM region 11 and the RAM region 10 with a sufficient signal intensity ratio by increasing the width L1 of the magnetic portions 15 in the ROM region 11 to be broader than the width L2 of the magnetic portions 13 in the RAM region 10.

The magnetic recording medium according to the embodiment of the invention has a feature that all the regions have the same track width.

On condition that all of the regions have the same track width, prediction and control are easy to carry out when the read/write head is moved to an arbitrary track. In the magnetic recording medium according to the embodiment of the invention, the width of the magnetic portions changes from one region to another region. If the width of the track is changed in accordance with the width of the magnetic portions, it is difficult to position the head to the tracks during the recording/reproducing operation. Therefore, the magnetic recording medium according to the embodiment of the invention has a feature that an interval between adjacent tracks; i.e., the track width of the respective regions, is uniform. Namely, in the medium according to the embodiment of the invention, the track intervals are constant and only the widths of the magnetic portions are different in each region.

Figure 6:
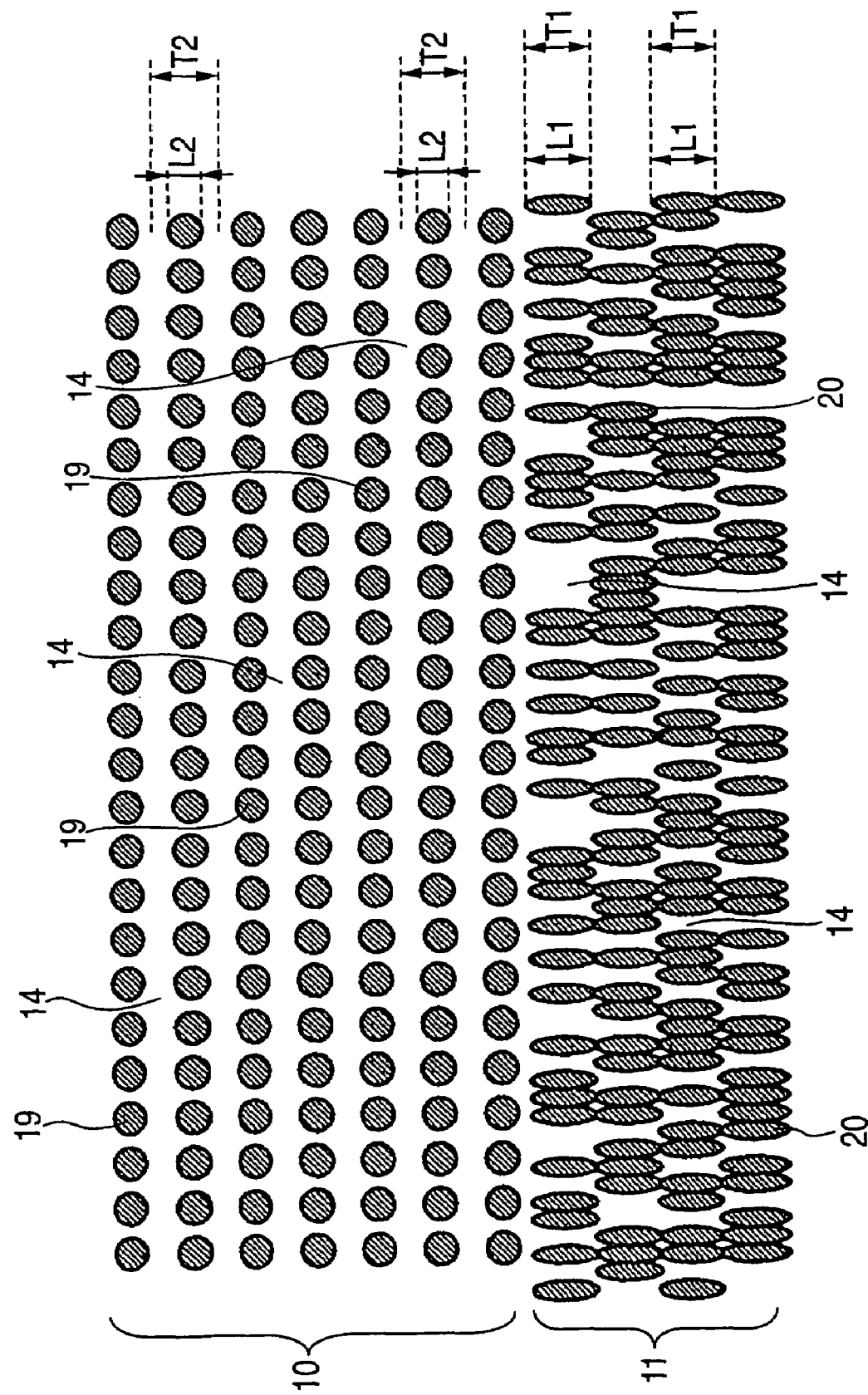
FIG. 6 is a schematic diagram illustrating a part of the planar structure of a magnetic recording medium of a patterned medium according to an embodiment of the invention.

FIG. 6 is a schematic diagram illustrating a part of the planar structure of a magnetic recording medium of a patterned medium according to an embodiment of the invention. This magnetic recording medium has the RAM region 10 and the ROM region 11. Specifically, magnetic portions of the magnetic recording medium are so-called "patterned mediums", and adjacent magnetic portions are not in contact with each other. The "patterned mediums" used herein refer to magnetic portions not only physically separated from each other if they are in adjacent tracks, but also separated from each other in the longitudinal direction of the tracks.

In the RAM region 10, a plurality of magnetic portions 19 are intermittently arranged at given intervals in the longitudinal direction of the tracks. In the RAM region 10, magnetic portions in adjacent tracks are physically separated from each other. Specifically, the width L2 of the magnetic portions 19 is smaller than the track width T2 when viewed in the direction perpendicular to the longitudinal direction of the track. Areas other than the magnetic portions 19 are formed of the nonmagnetic portions 14.

On the other hand, in the ROM region 11, a plurality of magnetic portions 20 are intermittently arranged at irregular cycles in the longitudinal direction of the tracks. Specifically, the magnetic portions 20 in the same track are not uniform and are arranged intermittently. Even in the ROM region 11 of the specific example, magnetic portions in adjacent tracks remain in physical contact with each other as described in connection with FIG. 1. Specifically, the width L1 of the magnetic portions 20 when viewed in the direction perpendicular to the longitudinal direction of the tracks is equal to the track width T1. Areas other than the magnetic portions 20 in the ROM region are formed of the nonmagnetic portions 14.

In this magnetic recording medium, the width L1 of the magnetic portions 20 in the ROM region 11 is greater than the width L2 of the magnetic portions 19 in the RAM region 10. The track width T1 in the ROM region 11 is equal to the track width T2 in the RAM region 10.

As mentioned above, in the embodiment of the invention, the magnetic portions may be patterned mediums. Data can be reproduced in both the ROM region 11 and the RAM region 10 at a sufficient signal intensity ratio so long as the width L1 of the magnetic portions 20 in the ROM region 11 is greater than the width L2 of the magnetic portions 19 in the RAM region 10.

Figure 7:
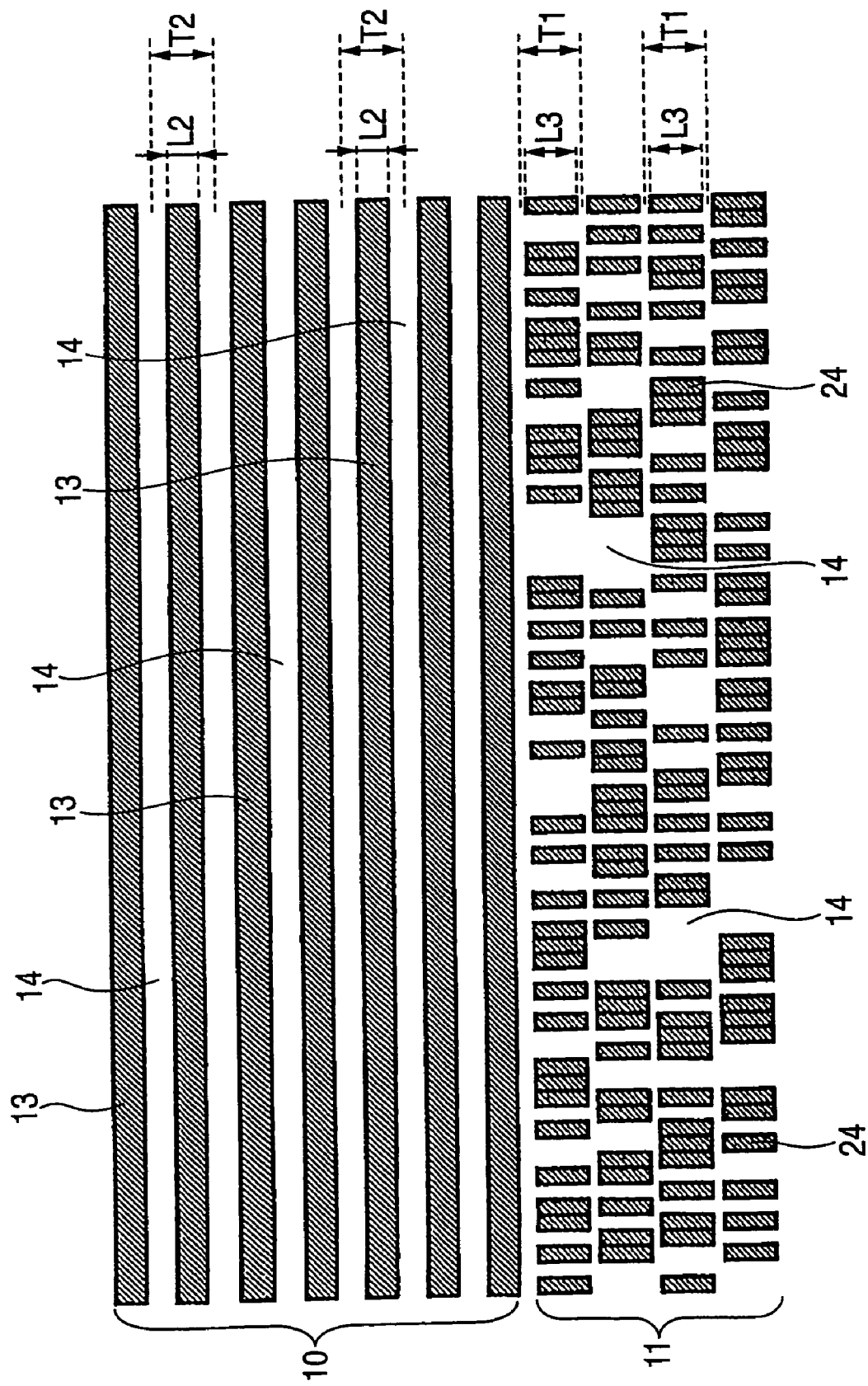
FIG. 7 is a schematic diagram illustrating a part of the planar structure of a magnetic recording medium according to another embodiment of the invention.

FIG. 7 is a schematic diagram showing a part of the planar structure of a magnetic recording medium according to another embodiment of the invention. FIG. 7 shows the planar structure of the RAM region 10 and that of the ROM region 11 in the magnetic recording medium.

In the RAM region 10, a plurality of magnetic portions 13 are continuously arranged to extent in the direction of the tracks. In the RAM region 10, the magnetic portions 13 in adjacent tracks are physically separated from each other. Specifically, the width L2 of the magnetic portions 13 when viewed in the direction perpendicular to the longitudinal direction of the tracks is smaller than the track width T2. Areas other than the magnetic portions 13 are formed of the nonmagnetic portions 14. Hence, in the RAM region 10, strips of the magnetic portions 13 and strips of the nonmagnetic portions 14 are arranged alternately.

On the other hand, in the ROM region 11, a plurality of magnetic portions 24 are intermittently arranged in the longitudinal direction of the tracks. Intervals between the magnetic portions 24 in a single track are not constant, and the magnetic portions 24 are arranged intermittently. In the ROM region 11, the magnetic portions in adjacent tracks are physically separated from each other. Specifically, a width L3 of the magnetic portions 24 in the direction perpendicular to the track direction is smaller than the track width T1. In the ROM region 11, areas other than the magnetic portions 24 are formed of the nonmagnetic portions 14.

In this magnetic recording medium, the width L3 of the magnetic portions 24 in the ROM region 11 is greater than the width L2 of the magnetic portions 13 in the RAM region 10. The track width T1 in the ROM region 11 is equal to the track width T2 in the RAM region 10.

As mentioned above, even if the width L3 of the magnetic portions 24 in the ROM region 11 is smaller than the track width T1 in the ROM region 11, data can be reproduced with a sufficient signal intensity ratio in both the RAM region 10 and the ROM region 11 so long as the width L3 of the magnetic portions 24 in the ROM region 11 is greater than the width L2 of the magnetic portions 13 in the RAM region 10.

Figure 8:
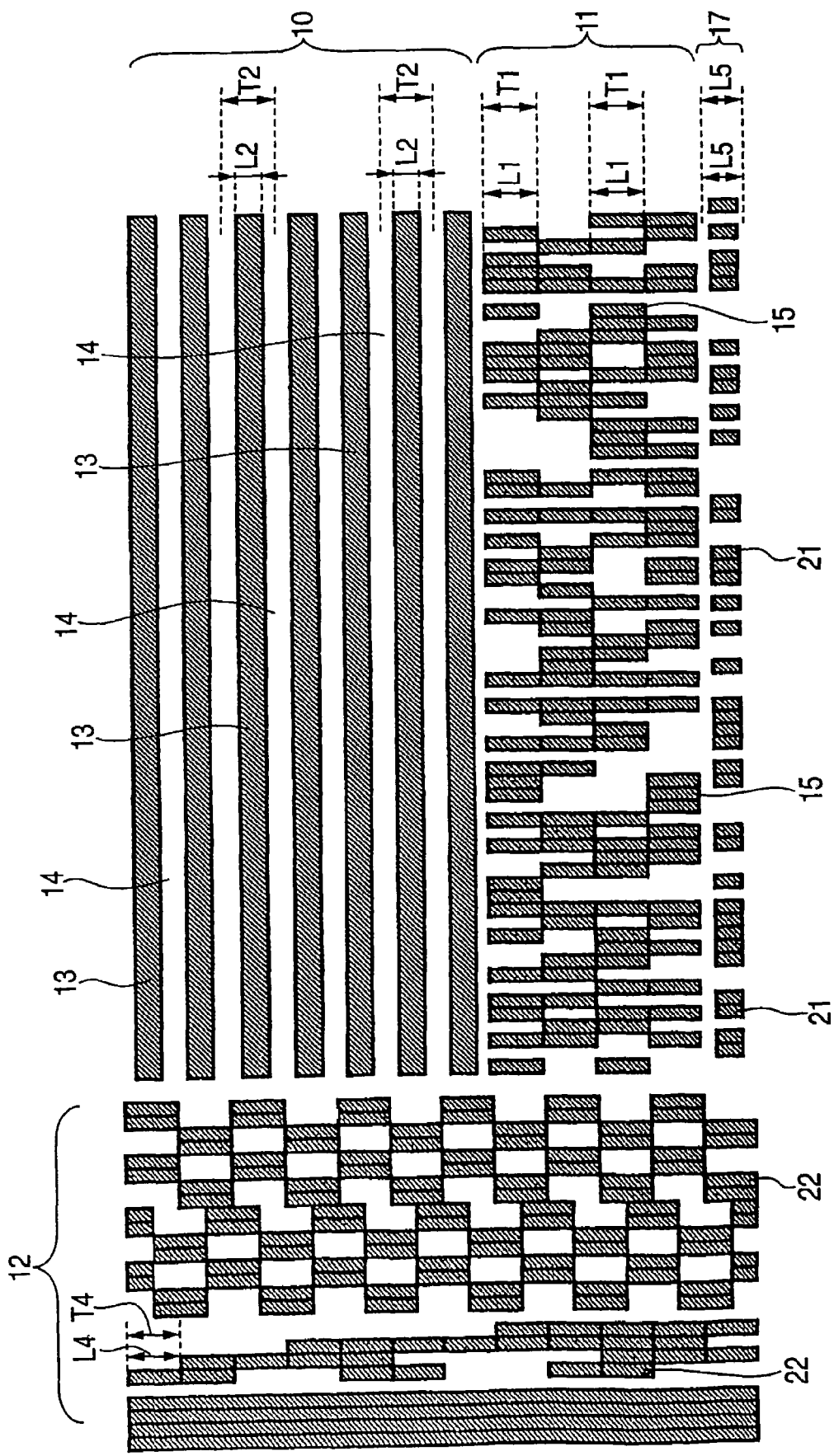
FIG. 8 is a schematic diagram illustrating a part of the planar structure of a magnetic recording medium according to an embodiment of the invention.

FIG. 8 is a schematic diagram showing a part of the planar structure of a magnetic recording medium according to an embodiment of the invention. FIG. 8 shows the planar structure of the RAM region 10, that of the ROM region 11 in the magnetic recording medium, that of a servo region 12, and that of an authentication region 17.

In the RAM region 10 in which data are recorded by magnetization directions of magnetic portions, the magnetic portions 13 are continuously arranged in parallel to the longitudinal direction of the tracks. In the ROM region 11 in which data are recorded by absence/presence of magnetic portions, the magnetic portions 15 are intermittently arranged in parallel to the longitudinal direction of the tracks. The width L1 of the magnetic portions 15 in the ROM region 11 is greater than the width L2 of the magnetic portions 13 in the RAM region 10. Areas other than the magnetic portions are formed of the nonmagnetic portions 14.

Positional data are recorded in a servo region 12 by presence/absence of a magnetic portion 22. The magnetization directions of the magnetic portions 22 are aligned in a given direction with respect to the direction of the track. When a read head passes over the servo region 12 in the approximate track direction, the positional information can be acquired. At least a preamble signal, an address signal, and a positioning burst signal are present in the servo region 12. The width L4 of the magnetic portions 22 in the servo region 12 is greater than the width L2 of the magnetic portions 13.

In an authentication region 17, magnetic portions 21 are intermittently arranged in the longitudinal direction of the track, and data are written by means of both presence/absence of the magnetic portions 21 and magnetization directions of the magnetic portions 21. In the authentication region 17, the magnetic portions 21 are intermittently arranged in the direction of the track. On the basis of certain data, magnetization of the magnetic portions 21 can be changed. Specifically, at the time of authentication, the read head 18 moves over the arrangement of the magnetic portions 21, and the read head 18 sequentially reads magnetic fields corresponding to presence/absence of the magnetic portion 21 and the magnetization direction of the magnetic portions 21. The thus-read data are stored as "key data A".

Subsequently, the write head 18 writes magnetization into the magnetic portions 21 in accordance with a given rule.

Further, the read head 18 moves over the arrangement of magnetic portions 21, and the read head 18 sequentially reads presence/absence of the magnetic portions 21 and the magnetic field from the magnetization direction of the magnetic portions 21. The thus-read data are stored as "key data B". Authentication is performed through use of the thus-obtained "key data A" and "key data B". In this specific example, the track width T1 of the ROM region 11, the track width T2 of the RAM region 10, the track width T4 of the servo region 12, and the track width T5 of the authentication region 17 may be made equal to each other.

As mentioned above, in the authentication region 17, the magnetic portions 21 are intermittently arranged in the longitudinal direction of the track as in the case of the ROM region 11. The write head records and writes data onto the magnetic portions during the authentication operation, whereupon recording is performed by means of the magnetization direction. Accordingly, in order to read data formed by presence/absence of the magnetic portions, a larger width L5 of the magnetic substances is preferable, as in the case of the ROM region 11. However, in order to record the magnetization direction of the magnetic portions, physical separation of adjacent strips of magnetic portions 21 is preferred as in the case of the RAM region 10. Consequently, the width L5 of the magnetic portions 21 in the authentication region 17 is made smaller than the width L1 of the magnetic portions 15 in the ROM region 11. It is preferable that the width L5 of the magnetic portions 21 in the authentication region 17 is smaller than the width L1 of the magnetic portions 15 in the ROM region 11 and that the width L5 of the magnetic portions 21 in the authentication region 17 is equal to or greater than the width L2 of the magnetic portions 13 in the RAM region 10.

It is noted that U.S. patent application Ser. No. 10/606,788 (published as US2004/0107355 A1) discloses a method for performing authentication about a magnetic recording medium in detail, entire contents of which are incorporated herein by reference.

Figure 9:
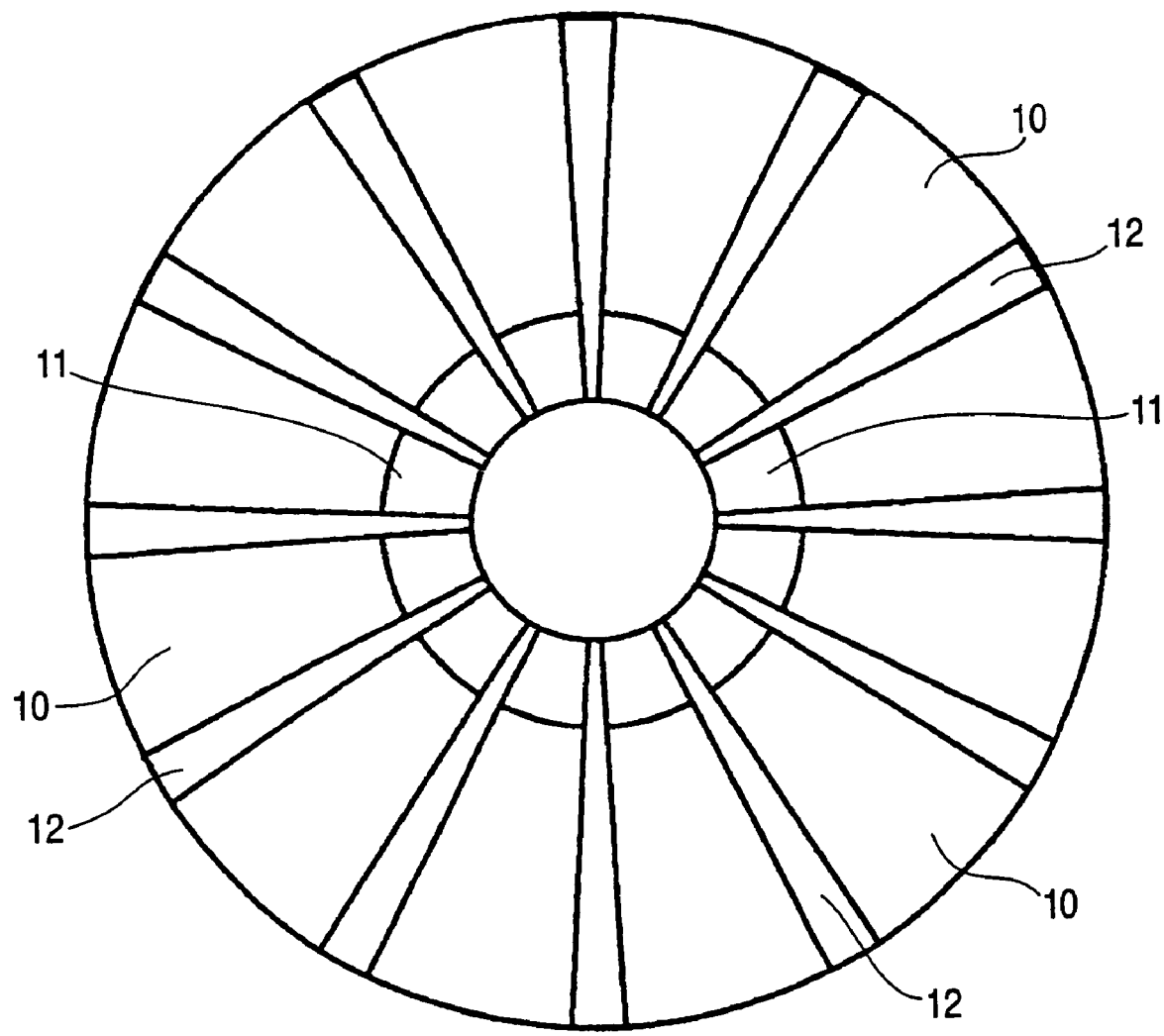
FIG. 9 is a schematic diagram illustrating a part of the planar structure of a magnetic recording medium according to the embodiments of the invention.

FIG. 9 is a schematic diagram showing a part of the planer structure of a magnetic recording medium according to the embodiments of the invention. As shown in FIG. 9, the toroidal RAM region 10 exists in the outer periphery of the disk, and the toroidal ROM region 11 exists in the inner periphery of the disk. A plurality of sector-shaped servo regions 12 are radially present. The respective servo regions 12 are written radially with respect to the disk of the magnetic recording medium. In association with rotation of the disk, the read/write head 18 on the track passes the servo region 12 at every given time intervals.

The RAM region 10 and the ROM region 11 are not mixedly present. That is, when concentrically viewed from above, the toroidal RAM region 10 is present at in outer periphery and the toroidal ROM region 11 is provided in the inner periphery. When the ROM region 11 of the magnetic recording medium according to the embodiments is initialized, an area to which an external magnetic field 32 is applied falls inside a specific circle. Hence, it is preferable that the ROM region 11 is disposed in the inner periphery of the disk.

Figure 10:
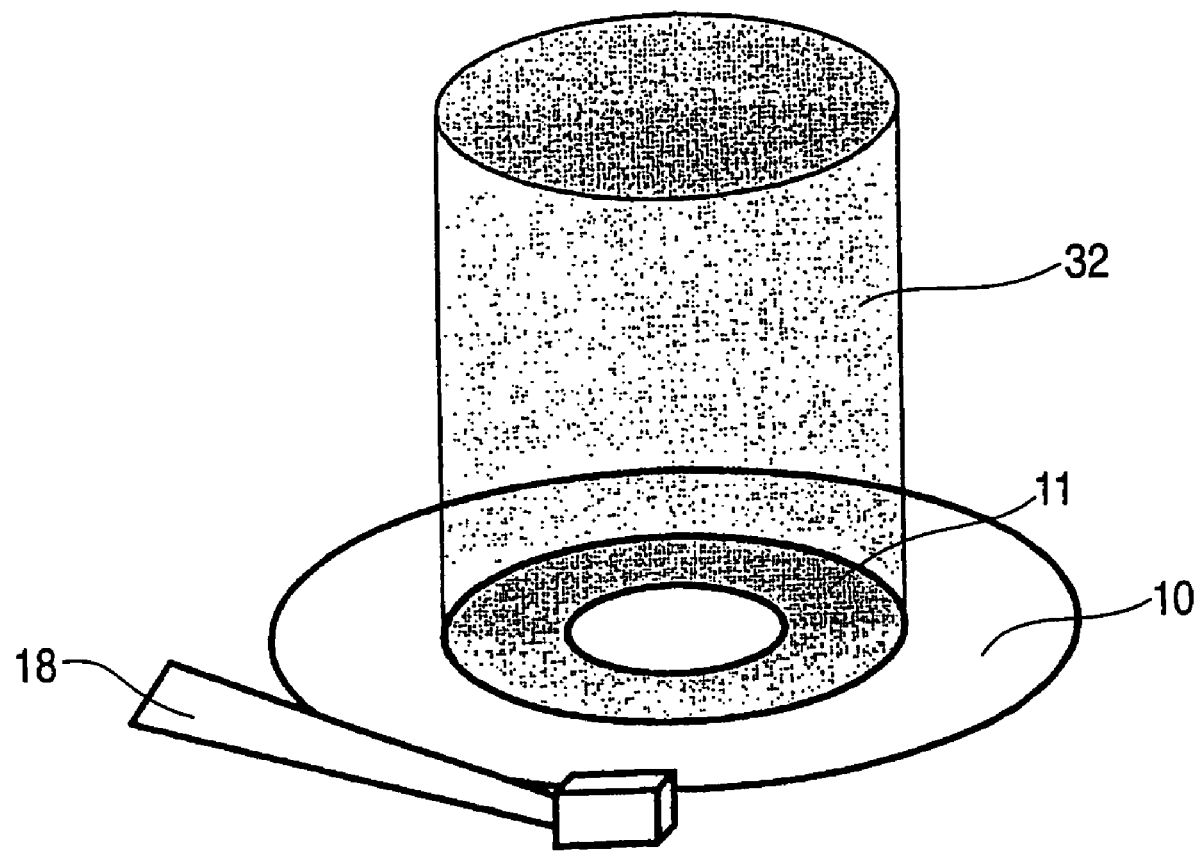
FIG. 10 is a schematic diagram for describing a method for initializing the ROM region 11 of the magnetic recording medium according to the embodiments of the invention.

FIG. 10 is a schematic diagram for describing a method for initializing the ROM region 11 of the magnetic recording medium according to the embodiments of the invention. As shown in FIG. 10, when the ROM region 11 of the magnetic recording medium is initialized, the read/write head 18 is retracted to the outside of the medium disk so that it is prevented that an external magnetic field destroys the read/write head 18. A magnetic field 32 higher than the coercivity of the magnetic portions is applied to the ROM region 11 of the disk, thereby aligning the magnetization directions of the magnetic portiosn in the ROM region 11.

When the ROM region is initialized by the external magnetic field, it is preferable that a medium is of vertical recording type and that the magnetic field is applied in a direction perpendicular to the surface of the medium.

According to this initialization method, the servo regions 12 are also exposed to the external magnetic field 32. However, the magnetization direction of the magnetic portions in the servo regions 12 must be aligned. Hence no problem arises if the magnetization direction is the same as that of the external magnetic field 32.

Specifically, it is preferable that the ROM region 11 of the magnetic recording medium according to the embodiments of the invention is magnetized in a given direction with respect to the direction of the track. In the magnetic recording medium of the embodiments, the magnetic field 32 higher the coersivity of the magnetic portions is applied externally to the particular ROM region 11 of the recording medium to align the magnetizations of the magnetic portions 15 in the ROM region 11 at a time. Therefore, in comparison with a method for aligning magnetizations by using a write head, this method can perform initialization faster. With regard to a range of magnetization, only the ROM region may be initialized by applying a magnetic field solely to the ROM region in the inner periphery of the medium, or the overall medium may be initialized in one operation by applying a magnetic field to the entire medium.

Figure 11:
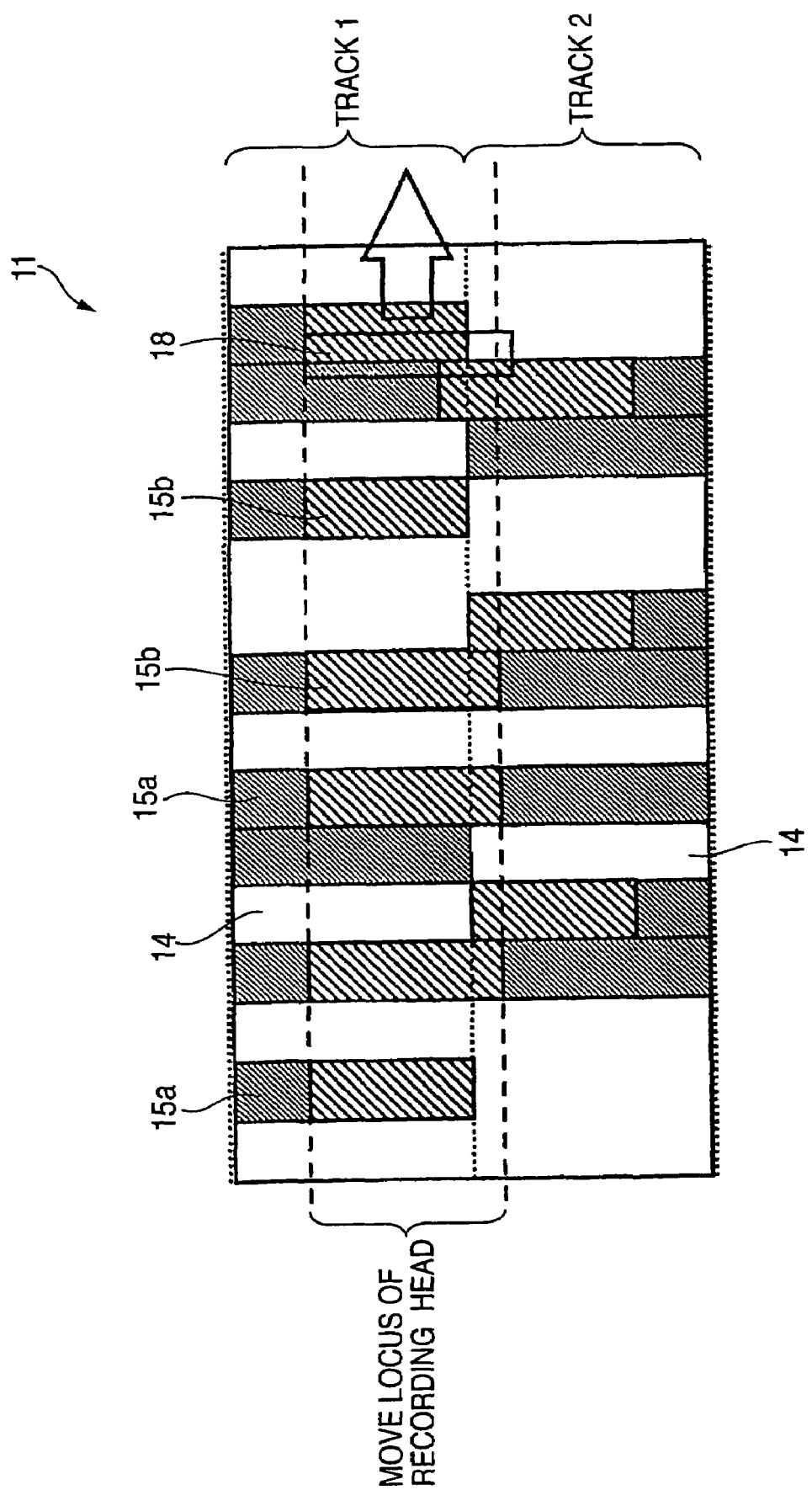
FIG. 11 is a schematic diagram for explaining nullification of the ROM region 11 of the magnetic recording medium according to the embodiments of the invention.

FIG. 11 is a schematic diagram for explaining nullification of the ROM region 11 of the magnetic recording medium according to the embodiments of the invention. FIG. 11 shows magnetic portions in two adjacent tracks within the ROM region 11. In the ROM region 11, the nonmagnetic portions 14, magnetic portions 15a having such a magnetization direction to impart a signal +1 to the read head 18, and magnetic portions 15b having such a magnetization direction to impart a signal −1 to the read head 18 are intermittently arranged in the direction of the tracks.

Before nullification, the magnetization directions of the magnetic portions 15 are aligned to +1 by means of the previously-described initializing method. In this state, the write head 18 moves over the ROM region 11 while writing a certain signal pattern. If the position of the head 18 is shifted slightly toward a track 2 so that data are magnetically recorded on the magnetic portions in an area larger than the locus of the head, data having a magnetization direction of −1 are written into the magnetic portions 15 in the track 2 as shown in FIG. 11.

Even when the read head 18 attempts to reproduce data from the track 1 or track 2 after this operation, the data which the read head 18 has attempted to read; that is, magnetization of the track 1 in direction −1 and magnetization of the track 2 in direction +1, are not reproduced. In this case, data reproduced from a reproduction signal are unpredictable. Moreover, it is difficult to obtain data of the ROM region 11 at a time of the initialization from the data of the reproduction signal. In this state, the ROM region 11 of the magnetic recording medium according to the embodiments of the invention cannot be used for reading data of the ROM region 11. In other words, the ROM region 11 is nullified.

As in the case of the RAM region 10, the write head 18 usually does not record or write data into the ROM region 11 of the magnetic recording medium according to the embodiments of the invention. Hence, the width L1 of the magnetic portions 15 in the ROM region 10 may be made greater than the width L2 of the magnetic portions 13 in the RAM region 10. Therefore, when the write head 18 writes data into the ROM region 11, because the positional shift of the write head 18 and size of the recorded magnetization are large, magnetizations of the magnetic portions 15 in adjacent tracks are affected. Therefore, even when the read head 18 reads signals from the ROM region 11 after the recording and writing operations, there is little chance that data recorded by the write head 18 can be reproduced in their original forms.

As mentioned above, in the ROM region 11 of the magnetic recording medium according to the embodiments of the invention, the ROM region 11 can be nullified by writing given data with the write head 18. As a result, access to, e.g., the ROM region 11, can be prohibited at an arbitrary timing during use of the recording medium.

Even after having been nullified, the ROM region 11 can be used again, by means of employing the previously-described ROM region initialization method.

Figure 12:
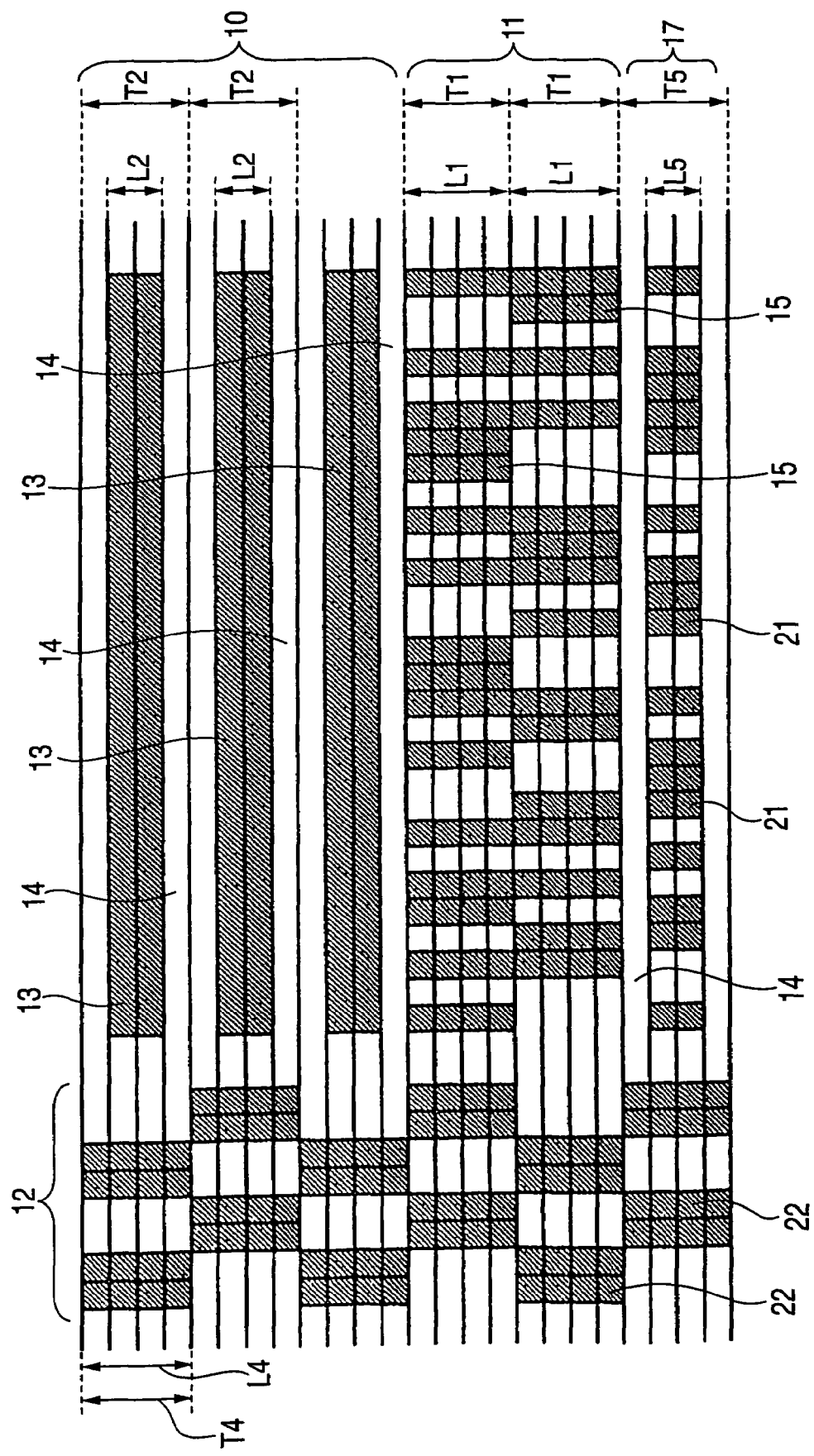
FIG. 12 is a schematic view for describing a method for writing data into the magnetic recording medium according to the embodiments of the invention.

FIG. 12 is a schematic view for describing a method for writing data into the magnetic recording medium according to the embodiments of the invention. FIG. 12 shows a part of the planar structure of the RAM region 10, the ROM region 11, the servo region 12, and the authentication region 17 of the magnetic recording medium according to the embodiments of the invention. As in the case of the magnetic recording medium shown in FIG. 8, in the magnetic recording medium shown in FIG. 12, the width L1 of the magnetic portions 15 in the ROM region 11 and the width L4 of the magnetic portions 22 in the servo region 12 are greater than the width L2 of the magnetic portions 13 in the RAM region 10 and the width L5 of the magnetic portions 21 in the authentication region 17, respectively.

As indicated drawing lines in FIG. 12, one track is written by four drawing lines arranged at uniform intervals. Of these drawing lines, the width of magnetic portions can be changed depending on number of the drawing lines used for writing a magnetic substance pattern. For instance, in FIG. 12, the RAM region 10 is written by two drawing lines; the ROM region 11 is written by four drawing lines; and the authentication region 17 is written by two drawing lines. Consequently, a structure having magnetic portions can be prepared in which widths of the magnetic portions in the RAM region and the authentication region are about half of the track width, and widths of the magnetic portions in the ROM region are substantially equal to the entire track width.

As mentioned above, under the method for drawing the magnetic recording medium according to the embodiments of the invention, the width of the magnetic portion can be changed by the manner of selecting the number of drawing lines used for drawing a master disk.

FIG. 13 is a schematic diagram showing a method for manufacturing a magnetic recording medium according to the embodiments of the invention. After a resist film has been applied onto a glass disk 25 having a diameter of 8 inches and a thickness of 5 mm by means of the spin coating method, the disk 25 is exposed to electrons 24 while being rotated. At this time, a spot of the electrons 24 has a width of 50 nm. The master glass disk 25 is exposed to an electron beam while a position to be exposed to the electron beam is shifted by 50 nm in the radial direction of the master disk 25 every rotation of the master glass disk 25. A track pitch is set to 200 nm, and one track is written by four drawing lines.

The drawn region is a range defined by an inner radius of 12 mm to 30 mm, and 120 servo regions are provided over the entire perimeter of the disk. The authentication region is a range defined by a radius of 12 mm to 13 mm. The ROM region is a range defined by a radius of 13 mm to 15 mm. The RAM region is a range from 15 mm to 30 mm.

In the authentication region 17 and the RAM region 10, drawn are two center lines of the four drawing lines in the track. In the ROM region, all of the four drawing lines in the track are drawn. Data required to install an OS are written into the ROM region 11 while being encrypted. Data based on random numbers are written into the authentication region 17.

Next, processes for manufacturing the magnetic recording medium according to the embodiments of the invention will be described as another embodiment of the invention.

FIGS. 14 and 15 are schematic diagrams showing processes for manufacturing the magnetic recording medium according to the embodiments of the invention.

Figure 14A:
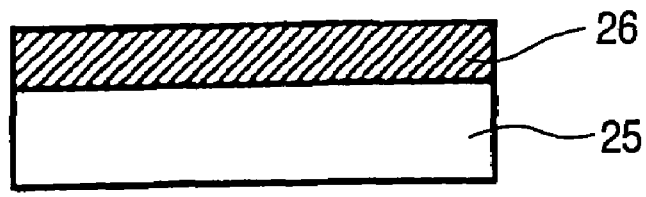
FIGS. 14A to 14D are schematic diagrams illustrating processes for manufacturing a magnetic recording medium according to the embodiments of the invention.

As shown in FIG. 14A, a resist film 26 for electron drawing is applied over the glass master disk 25 to have a thickness of 100 nm by means of the spin coating method.

Figure 14B:
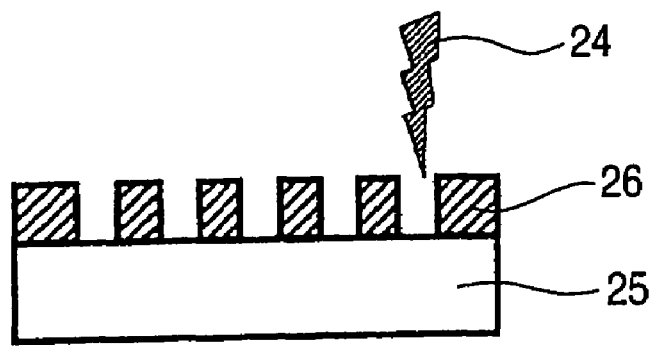

As shown in FIG. 14B, a pattern is drawn on the resist film 26 by means of the electron beam 24. The electron beam is radiated onto positions of the recording medium, which would finally be nonmagnetic portions. The glass master disk 25 is processed by a developing solution, whereby an irregular pattern is formed in the surface of the resist film 26 on the glass master disk 25. The positions exposed to the electron beam 24 become a recessed pattern.

Figure 14C:

Subsequently, as shown in FIG. 14C, the glass master disk 25 is etched in $CF_4$, thereby transferring the irregular pattern of the resist film 26 to the glass master disk 25. Thus, a master disk 27 for producing an imprint stamper is obtained. At this time, the irregular pattern formed in the surface of the master disk 27 has about 100 nanometers in depth.

Figure 14D:
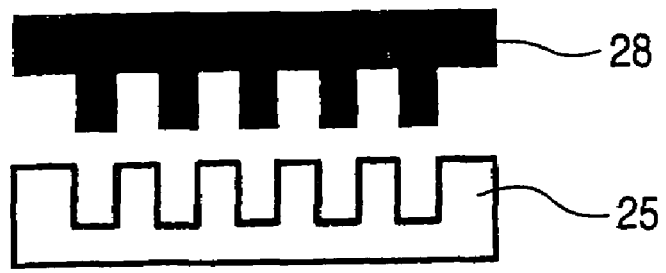

Finally, as shown in FIG. 14D, the surface of the master disk 27 is subjected to nickel electroforming, to thus obtain an imprint stamper 28. The depth of irregularities of the imprint stamper 28 is about 50 nanometers.

Figure 15A:
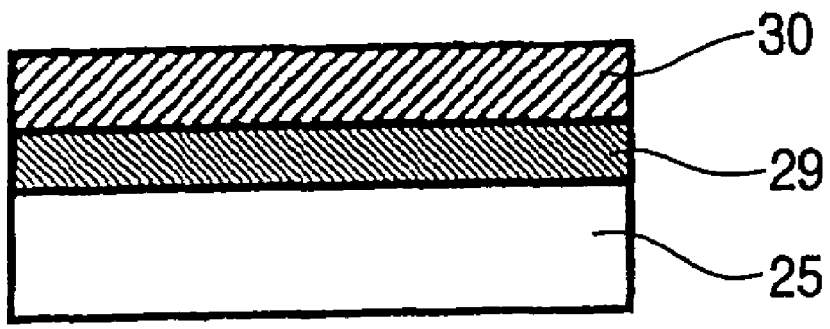
FIGS. 15A to 15C are schematic diagrams illustrating processes for manufacturing a magnetic recording medium according to the embodiments of the invention.

As shown in FIG. 15A, a soft magnetic layer having a ruthenium alloy is formed on the toroidal glass disk 25, which has a radius of 65 mm and a bore having an inner radius of 20 mm. A magnetic film 29 of vertical recording type having a recording layer made of a cobalt alloy is formed on a surface of the soft magnetic layer by means of the sputtering method. A novolak-type resist 30 is applied to have a thickness of 70 nm by means of the spin coating method.

Figure 15B:
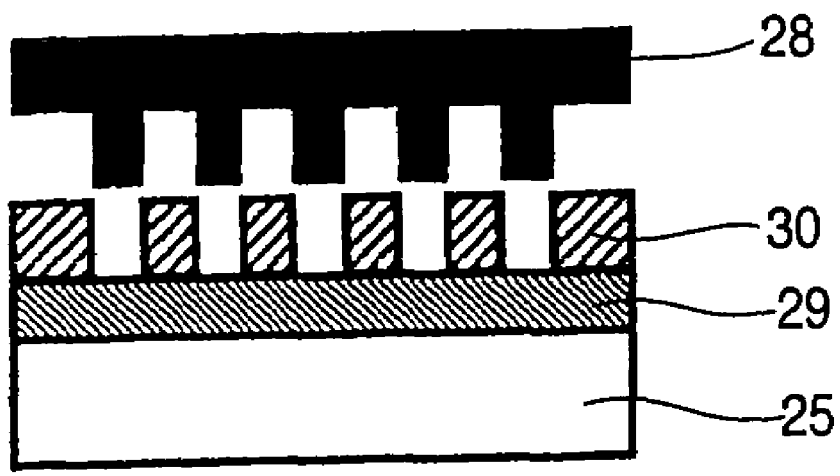

As shown in FIG. 15B, the imprint stamper 28 is pressed against the glass disk 25 for one minute at a pressure of 500 atm. The irregularities in the surface of the imprint stamper 28 are transferred onto the resist film 30 on the surface of the glass disk 25.

Figure 15C:

As shown in FIG. 15C, the irregular pattern has been transferred on the surface of the resist 30 such that an area from which magnetic portions are to be finally removed has a depth of 50 nm.

The surface of this glass disk 25 is subjected to argon ion milling, thereby etching the resist film 30 and the magnetic film 29. The magnetic film 29 is also removed from an area of the surface of the resist film 30 having a recessed structure, by means of milling. In areas of the surface of the resist film 30 where no recess is formed, the resist film 30 is etched by milling, but etching fails to reach the magnetic film 29, whereby the magnetic portions are left.

The thus-obtained glass disk is subjected to oxygen ashing, thereby removing the remaining resist 30. As a result, a pattern formed of the magnetic portions is obtained. A protective film is formed on the surface of the glass disk by means of the carbon sputtering, to thus form a magnetic recording medium.

An example usage of the thus-obtained magnetic recording medium according to the embodiments of the invention will now be described.

As mentioned previously in connection with FIG. 10, the magnetic field 32 of 3000 Oe (oersted) is applied to the ROM region 11 of the magnetic recording medium, thereby initializing the ROM region 11. Further, random numbers differing from those recorded previously are written into the authentication region 17 by means of an authentication region initializing device, thereby rendering the magnetic recording medium usable.

The thus-initialized magnetic recording medium can be used in various applications.

For instance, this magnetic recording medium can be used as a disk installed with the OS (Operating System) of a computer. Specifically, the magnetic recording medium is built in the magnetic recording apparatus. When the magnetic recording apparatus is built into a computer, the read head 18 reads the authentication regions 17, to thus acquire the "key data A." The write head 18 subsequently writes the data in the authentication region 17. Then, the read head 18 reads data from the same authentication region 17, thereby acquiring the "key data B." A "cipher key K" is obtained from the "key data A" and the "key data B." The encrypted OS install data written in the ROM region 11 are decrypted by the thus-obtained "cipher keyK." The OS is installed in the RAM region 10 of the recording medium such that the computer is activated through use of the magnetic recording apparatus.

The width L1 of the magnetic substances in the ROM region 11 is greater than the width L2 of the magnetic substances in the RAM region 10, and hence a sufficient signal intensity ratio is ensured between the ROM region 11 and the RAM region 10, whereby reproduction is performed without any problems.

After completion of installation of the OS, the write head 18 writes in the ROM region 11 data consisting of an alternating sequence of, e.g., 10101010. Consequently, an overlap exists between adjacent tracks, thereby nullifying the ROM region 11. As a result, the recorded data cannot be reproduced in their original form. Subsequently, even when the recording apparatus is removed and the OS is installed through use of another personal computer, the data in the ROM region 11 cannot be read, thereby limiting the number of times the OS can be installed. In short, fraudulent copying of the OS can be prevented.

This advantage can also be applied to a system for renting a magnetic recording medium on which music or a video is recorded.

Specifically, a service dealer collects the magnetic recording apparatus whose ROM region 11 is nullified, and the thus-collected magnetic recording apparatus is set on the apparatus for initializing the ROM region 11. In the apparatus for initializing the ROM region 11, the read/write head 18 recedes to the outside of the disk, and the magnetic field 32 of 5000 Oe is applied to a circular range up to a radius region of 15 mm of the recording medium, thereby aligning the magnetization direction on the medium. Moreover, the service dealer again writes the cipher data A in the authentication region 17 on the basis of the data pertaining to the authentication region 17 held by the service dealer. As a result, the ROM region 11 of the recording medium is initialized, whereby the ROM region 11 again becomes usable.

Thus far, the embodiments of the invention have been described with reference to the specific examples. However, the invention is not limited to the specific examples. For instance, with regard to a specific material forming the magnetic recording medium and film thickness, geometry, and dimensions thereof, all materials, film thickness, geometries, and dimensions—which enable practice of the invention and yielding of the same advantage so long as one skilled in the art makes appropriate selection—fall within the scope of the invention.

In other respects, all magnetic recording mediums—which one skilled in the art can achieve by appropriate design change on the basis of the magnetic recording medium described as the embodiments of the invention—fall within the scope of the invention.

What is claimed is:

1. A magnetic recording medium comprising:
   a servo region configured to provide positional read/write head data associated with alignment of the read/write head of record/reproducing device for the magnetic recording medium;
   a RAM region including a plurality of first tracks having a first magnetic portion, the first magnetic portions in adjacent tracks being physically separated by nonmagnetic portions from each other; and a ROM region including a plurality of second tracks having a second magnetic portion, a width of the second magnetic portions in a direction perpendicular to a track direction of the first tracks being larger than that of the first magnetic portions in the perpendicular direction, the ROM region being initialized by applying a magnetic field so as to align a magnetization direction of the second magnetic portion in a given direction with respect to a direction of the second track;

wherein said RAM region and said ROM region are separated from the servo region, wherein a width of the first tracks in the perpendicular direction is equal to that of the second tracks in the perpendicular direction, wherein, in the ROM region, the second magnetic portions are intermittently arranged along the track direction, and wherein, in the ROM region, all the second megnetic portions are magnetized in the same direction.

2. The magnetic recording medium according to claim 1, wherein the first magnetic portions of the RAM region extend continuously in the track direction, each of the first magnetic portions being separated from an adjacent magnetic portion in an adjacent track by a non-magnetic portion.

3. The magnetic recording medium according to claim 1, wherein the first magnetic portions of the RAM region are arranged intermittently in the track direction, each of the first magnetic portions being separated from each other by a non-magnetic portion.

4. The magnetic recording medium according to claim 1, a width of the first tracks of the RAM region in the perpendicular direction and that of the second tracks of the ROM region in the perpendicular direction is different while respective pitches between the first tracks and between the second tracks is the same.

5. The magnetic recording medium according to claim 1, wherein the width of the second magnetic portions of the ROM region in the perpendicular direction is equal to that of the second tracks of the ROM region in the perpendicular direction.

6. The magnetic recording medium according to claim 1, wherein the width of the second magnetic portions of the ROM region in the perpendicular direction is smaller than that of the second tracks of the ROM region in the perpendicular direction.

7. The magnetic recording medium according to claim 1, further comprising:

an authentication region including a third track having a third magnetic portion, a width of the third magnetic portion in the perpendicular direction being smaller than that of the second magnetic portions of the ROM region in the perpendicular direction.

* * * * *